Feb. 11, 1958     O. G. FRYKMAN ET AL     2,822,695

GYROSCOPIC APPARATUS

Filed May 22, 1956

*INVENTOR.*
OSCAR G. FRYKMAN
DAVID A. LAURIE

BY

*Roger W. Jensen*

ATTORNEY

United States Patent Office 2,822,695
Patented Feb. 11, 1958

2,822,695

GYROSCOPIC APPARATUS

Oscar G. Frykman, Edina, and David A. Laurie, Minneapolis, Minn., assignors to Minneapolis-Honeywell Regulator Company, Minneapolis, Minn., a corporation of Delaware Application May 22, 1956, Serial No. 586,577

5 Claims. (Cl. 74—5.6)

Our invention pertains to gyroscopic apparatus and more specifically to connection means in a gyroscope for amplifying the angular displacement of a gimbal about a gimbal frame or output axis into angular rotation of a movable part of a pickoff about a pickoff axis. The invention is applicable to gyroscopic apparatus in general and is specifically applicable to rate gyroscopes.

In a rate gyroscope it is very advantageous to have an angular amplification between the gimbal of the gyro and the pickoff. The reason that this arrangement is desirable is that on the one hand it is desirable to keep the gimbal angular deflection or rotation about the gimbal frame axis within very small angular limits so as to keep "cross coupling" errors at a minimum and on the other hand it is desirable to have as much angular movement between the members of the pickoff as possible in order to have a maximum resolution of the pickoff. As is well understood by those skilled in the art, "cross coupling" errors occur in a rate gyroscope due to the gyro responding to inputs about axes other than the input axes as the rotor precesses about its regular output axis. Thus in a rate gyroscope the rotor is supported on a gimbal frame for rotation about a spin axis and the gimbal frame is supported for rotation about a gimbal frame or output axis normal to said spin axis. With this arrangement the input axis is the axis normal to both the spin axis and the gimbal frame or output axis. As long as the spin axis is perpendicular to the input axis then the gyro will respond to turning about the input axis only. In responding to turning movement about the input axis, however, the gyro will precess about its gimbal frame or output axis and in doing so the spin axis no longer is perpendicular to the input axis. During this condition the gyro can then respond to turning about other axes at an angle to the input axis and this response to turning about said other axes results in an error in the output of the gyro which is termed a "cross coupling" error. The "cross coupling" errors are proportional to the sine of the angle of gimbal displacement about the output axis. It follows therefore that to maintain "cross coupling" errors as small as possible it is desirable to keep the gimbal deflection angles as small as possible.

On the other hand, in order to obtain a useful range of signals from a signal generator pickoff, it is desirable to have a considerable range of angular deflection between the parts of the pickoff. This is especially true for potentiometer pickoffs where there is relative rotation or movement between a wiper and a resistive member.

There are other factors to be considered in providing a linkage between a gimbal and a signal generator pickoff of a rate gyro. Some of these considerations are linearity, hysteresis, durability, simplicity, and compactness.

Our invention provides a unique linkage between the gimbal and a signal generator pickoff of a gyroscope which mechanically amplifies the gimbal rotation about its axis into rotation between the parts of the pickoff about the pickoff axis. Our linkage is extremely linear, is free from hysteresis, is fatigue resistant, and is simple and compact.

An object of the invention is to provide in a gyroscope, an improved linkage between a gimbal and a pickoff operated by rotation of the gimbal about its gimbal axis wherein the gimbal angular rotation about its axis is amplified.

Other objects of our invention will be set forth more fully in and become apparent from a reading of the following specification and appended claims, in conjunction with the accompanying drawing in which:

Figure 1:
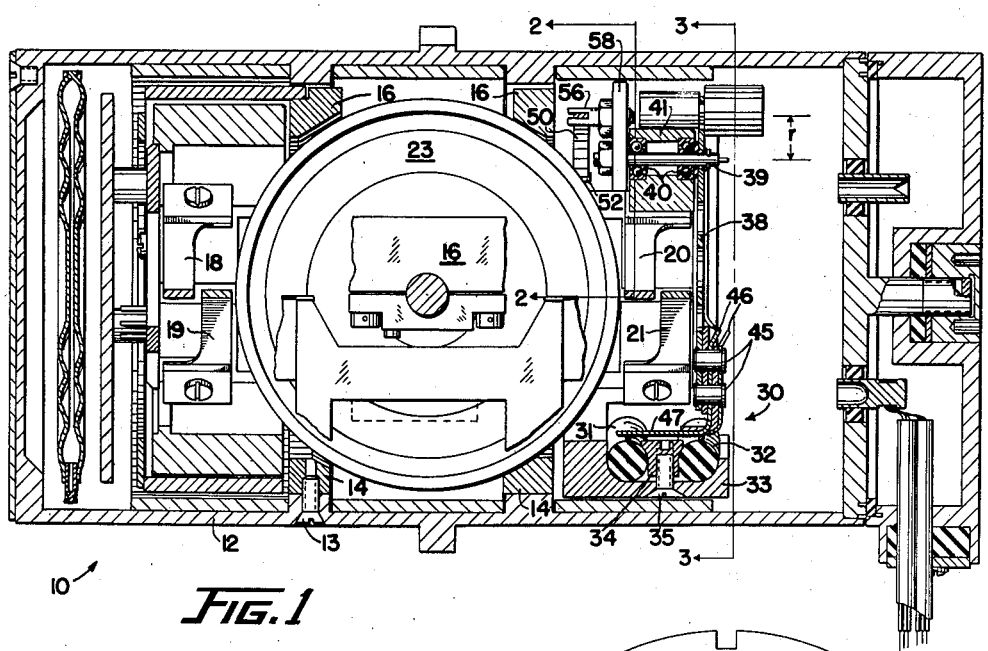
Figure 1 is a side view in cross section of a rate gyroscope embodying our invention.
Figure 3:
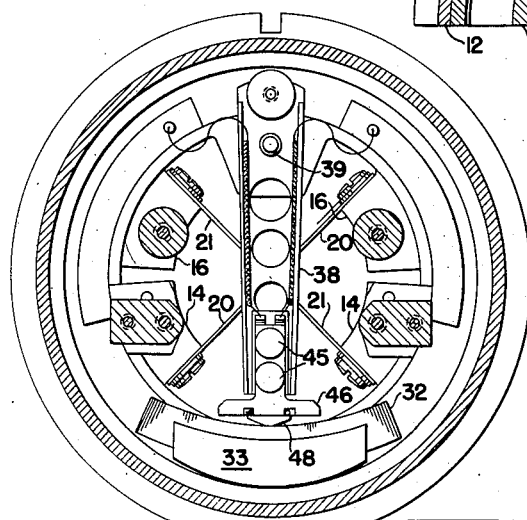
Figure 3 is a cross sectional view of the apparatus shown in Figure 1 as viewed along section lines 3—3.

The apparatus disclosed in Figure 1 is a rate gyroscope generally identified by reference numeral 10 which is similar in certain respects to the rate gyroscope shown in the J. G. Schaberg Patent No. 2,712,757. Gyroscope 10 includes an outer cylindrical housing member 12 to which is secured by suitable means, such as screws 13, a semi-cylindrical base member 14. A semi-cylindrical gimbal frame member 16 is suported for rotation about a gimbal frame axis relative to said base member 14 by a plurality of cross reeds 18, 19, 20, and 21, the extremities of which are secured to base member 14 and gimbal frame members 16, respectively (see Figure 3). For further constructional details concerning the base member 14, gimbal frame member 16, and cross reeds 18 through 21 reference is made to the above mentioned Schaberg patent. A gyro spin motor housing is identified by reference numeral 23 and is supported by gimbal frame member 16 for precession about the gimbal frame or output axis defined by the line of intersection of cross reeds 18 through 21. Rotor housing 23 contains a gyro spin rotor, not shown, which rotates about a spin axis perpendicular to the plane of the drawing and perpendicular to the output axis defined by the cross reeds 18 through 21. The input axis for rate gyroscope 10 is therefore the axis lying in the plane of the paper perpendicular to the gimbal frame axis defined by the intersection of cross reeds 18 through 21.

A signal generator pickoff of the potentiometer type is provided to develop a signal proportional to precession of the rotor case 23 about the gimbal frame axis. The pickoff identified generally by reference numeral 30 comprises a pair of curved resistive windings 31 and 32. Curved resistive members 31 and 32 are mounted in a bracket member 33 which is fastened to housing 12 by means not shown. Resistive members 31 and 32 are fixed in block member 33 by suitable means such as a clamping block 34 and screw means 35.

The pickoff 30 further includes a movable wiper carrying arm 38 fixed to a shaft 39 which is journalled by bearing means 40. Bearing means 40 are mounted in a support 41 which is integral with frame member 14. Movable wiper arm 38 has secured thereto by suitable means such as rivets 45 a pair of L-shaped brackets 46 having portions 47 thereof which extend adjacent to resistive members 31 and 32 and which have attached thereto wiper members 48 for engaging the resistive members 31 and 32.

Figure 2:
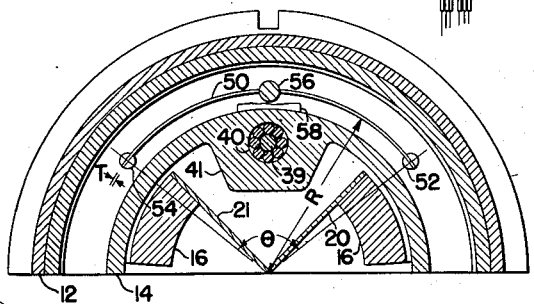
Figure 2 is a cross sectional view of the apparatus shown in Figure 1 as viewed along section lines 2—2.

The connection means provided for connecting the gimbal frame 16 to the arm member 38 of the pickoff 30 so that precession of the gimbal frame 16 about the gimbal frame axis is translated into relative rotation between the arm 38 and the resistive portions 31 and 32 of the pickoff include an arcuate or curved spring member 50 shown best in Figure 2. Spring 50 is preferably made out of a spring material commercially known as "Elgalloy" and has a rectangular cross section of a thickness T (see Figure 2). Spring 50 is adapted to be fastened to gimbal frame 16 at its extremities by being attached to a pair of post members 52 and 54, each of posts 52 and 54 being at a distance R from the gimbal frame axis defined by cross reeds 18 through 21 (see Figure 2). Curved spring 50 is connected to a post member 56 at its midpoint, post member 56 being secured to a lever member 58 which in turn is secured by suitable means to shaft 39 of the pickoff assembly. The distance between the point of connection of spring 50 to post 56 and the pickoff axis defined by bearings 40 is identified by the symbol $r$ (see Figure 1).

It will be appreciated that as the gyroscope responds to turning of the gyro about the input axis that the rotation of the gyro case 23 about the gimbal frame or output axis as defined by cross reeds 18 through 21 will be converted into rotation between resistive members 31 and 32 of the pickoff 30 and the movable arm 38 by the connection means including curved spring 50. The angular amplification of the connection means is proportional to the ratio of $R/r$. Thus for a relatively small angular travel of the gimbal frame 16 about the gimbal frame axis the movable arm 38 of pickoff 30 will rotate an appreciable amount about the pickoff axis as defined by bearings 40.

The spring material known commercially as "Elgalloy" has been found to be very satisfactory for the curved spring means 50. "Elgalloy" has a chemical composition of approximately 40% cobalt, 20% chromium, 15% nickel, 7% molybdenum, 2% manganese, traces of beryllium and carbon, and the remainder iron. It has been found for this particular material that the thickness T of the spring must be selected in accordance to the dimension R so the expression $T^3/R$ must be greater than $1 \times 10^{-9}$ but less than $4 \times 10^{-9}$. In a gyroscope similar to the one presently disclosed an "Elgalloy" spring having a thickness of 0.0033 inch was found to be satisfactory. The indicated range of values has been found to be the limits for the particular material identified. It should be understood however that other spring materials may be used for this connection means and that the limits expressed for "Elgalloy" should not be construed to limit the scope of the invention.

In Figure 2, the angle subtended by the connection posts 52 and 54 about the gimbal frame or output axis has been identified by the symbol $\theta$. It has been found that for best operation $\theta$ should be greater than 90 degrees but less than 180 degrees.

In general the thickness T of spring 50 as well as the angle $\theta$ subtended by the connection posts 52 and 54 are determined by the elastic properties of the spring material. As the gimbal rotation is transmitted to the pickoff, the spring 50 flexes slightly. Therefore, for relatively stiff spring materials, angle $\theta$ should be fairly large to permit flexing. Also, the stiffer that the spring material is, the smaller the dimension T is so as to permit the flexing described.

The connection means described will provide an angular amplification between the driven member or movable arm 38 of pickoff 30 and the driving member or gimbal frame 16 according to the ratio $R/r$. This connection means has the advantages of being extremely linear so that the rotation of the driving member and driven member is exactly proportional. In addition, the spring means 50 is subject to long life without fatigue and there is no problem of having play or deadspot in the connection linkage. In addition, the connection means is extremely simple and compact and has the ability of withstanding extreme vibration and shock without injury.

While we have shown and described a specific embodiment of this invention, further modifications and improvements will occur to those skilled in the art. For example, certain changes may be made in the curved spring 50 without exceeding the scope of the invention. An illustration of this, obvious to those skilled in the art, is that in order to keep the effective drive area of the spring constant and still reduce outer fibre stress in the spring material 50, the springs may be made wider and thinner. An alternative to making the springs wider is to use two or more thinner springs of the same width to replace a single spring. Thus a laminated spring assembly could be connected at its ends to posts 52 and 54 and at its mid-section to post 56. We desire it to be understood, therefore, that this invention is not limited to the particular form shown and we intend in the appended claims to cover all modifications which do not depart from the spirit and scope of this invention.

What we claim is:

1. In a rate of turn gyroscope; a rotor; a gimbal frame supporting said rotor for rotation about a spin axis; a base; means for pivotally mounting said gimbal frame on said base for precession about a gimbal frame axis; a signal generator pickoff having a first part fixed to said base and a second part supported for rotation relative to said first part about a pickoff axis; and means for connecting said gimbal frame to said second part of said pickoff so that precession of said gimbal frame about said gimbal frame axis is translated into relative rotation between said first and second parts of said pickoff, said connection means comprising an arcuate ribbon of rectangular cross-section secured at its extremities to said gimbal frame at a distance R from said gimbal frame axis, and a lever arm attached to said second part of said pickoff and fastened to the midportion of said ribbon at a distance $r$ from said pickoff axis, said precession of said gimbal frame about said gimbal frame axis being mechanically amplified by said connection means into rotation between said two parts of said pickoff about said pickoff axis an amount proportional to the ratio $R/r$.

2. In a rate gyroscope; a rotor; a gimbal frame supporting said rotor for rotation about a spin axis; a base, means for pivotally mounting said gimbal frame on said base for precession about a gimbal frame axis; a signal generator pickoff having a first part fixed to said base and a second part supported for rotation relative to said first part about a pickoff axis; and means for connecting said gimbal frame to said second part of said pickoff so that precession of said gimbal frame about said gimbal frame axis is translated into relative rotation between said first and second parts of said pickoff, said connection means comprising an arcuate "Elgalloy" spring of rectangular cross-section having a thickness T and being connected at its extremities to said gimbal frame at a distance R from said gimbal frame axis with said spring extremities subtending an angle measured about said gimbal frame axis of more than 90° but less than 180°, and means connecting said second part of said pickoff to the midportion of said spring at a distance $r$ from said pickoff axis, said precession of said gimbal frame about said gimbal frame axis being mechanically amplified by said connection means into rotation between said two parts of said pickoff about said pickoff axis an amount proportional to the ratio $R/r$, R and T being selected so that $T^3/R$ is greater than $1 \times 10^{-9}$ but less than $4 \times 10^{-9}$.

3. In a rate of turn gyroscope; a rotor; a gimbal frame supporting said rotor for rotation about a spin axis; a base; means for pivotally mounting said gimbal frame on said base for precession about a gimbal frame axis; a signal generator pickoff having a first part fixed to said base and a second part supported for rotation relative to said first part about a pickoff axis; and means for connecting said gimbal frame to said second part of said pickoff so that precession of said gimbal frame about said gimbal frame axis is translated into relative rotation between said first and second parts of said pickoff, said connection means comprising curved spring means secured at its extremities to said gimbal frame at a distance R from said gimbal frame axis, and means fastening said second part of said pickoff to the midportion of said curved spring means at a distance $r$ from said pickoff axis, said precession of said gimbal frame about said gimbal frame axis being mechanically amplified by said connection means into rotation between said two parts of said pickoff about said pickoff axis an amount proportional to the ratio $R/r$.

4. In a gyroscope; a rotor; a gimbal frame supporting said rotor for rotation about a spin axis; a gimbal frame support; means for pivotally mounting said gimbal frame on said support for rotation about a gimbal frame axis; a signal generator pickoff having a first part and a second part supported for rotation relative to said first part about a pickoff axis; and means for connecting said gimbal frame to said second part of said pickoff so that rotation of said gimbal frame about said gimbal frame axis is translated into relative rotation between said first and second parts of said pickoff, said connection means comprising an arcuate spring secured to said gimbal frame at two spaced points each a distance R from said gimbal frame axis, and means connecting said second part of said pickoff to said spring at a distance r from said pickoff axis, said rotation of said gimbal frame about said gimbal frame axis being mechanically amplified by said connection means into rotation between said two parts of said pickoff about said pickoff axis an amount proportional to the ratio $R/r$.

5. In a gyroscope; a rotor; a gimbal frame supporting said rotor for rotation about a spin axis; a gimbal frame support; means for pivotally mounting said gimbal frame on said support for rotation about a gimbal frame axis; a signal generator pickoff having a first part and a second part supported for rotation relative to said first part about a pickoff axis; and means for connecting said gimbal frame to said second part of said pickoff so that rotation between said gimbal frame and said support is translated into relative rotation between said first and second parts of said pickoff, said connection means comprising curved spring means connected to said gimbal frame and means connecting said second part of said pickoff to said curved spring means.

References Cited in the file of this patent

UNITED STATES PATENTS

| | | |
|---|---|---|
| 1,794,749 | Zelov | Mar. 3, 1931 |
| 2,290,232 | Fischer | July 21, 1942 |
| 2,291,612 | Draper | Aug. 4, 1942 |
| 2,712,757 | Schaberg | July 12, 1955 |